Figure 1:
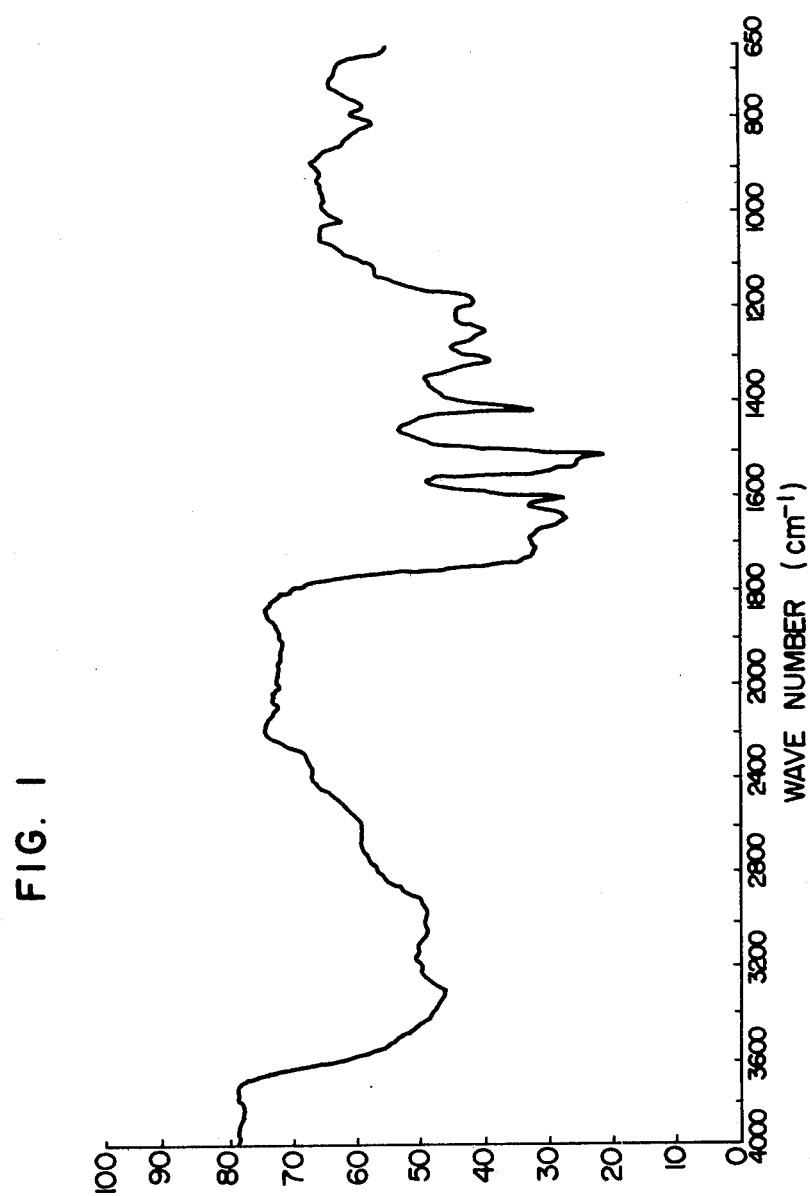

United States Patent [19]

Oka et al.

[11] 4,454,310

[45] Jun. 12, 1984

[54] POLYAMIDE ACID, PROCESS FOR PRODUCING SAME AND POLYIMIDE OBTAINED THEREFROM

[75] Inventors: Hiroshi Oka; Yoshinori Yoshida, both of Yokkaichi; Yuuzi Naitou, Yokohama, all of Japan

[73] Assignee: Japan Synthetic Rubber Co., Ltd., Tokyo, Japan

[21] Appl. No.: 450,041

[22] Filed: Dec. 15, 1982

[30] Foreign Application Priority Data

Dec. 21, 1981 [JP] Japan .............................. 56-205099
May 31, 1982 [JP] Japan ................................ 57-91295

[51] Int. Cl.$^3$ .......................................... C08G 73/10
[52] U.S. Cl. ................................. 528/188; 528/184; 528/352; 528/353
[58] Field of Search ............... 528/188, 184, 352, 353

[56] References Cited

U.S. PATENT DOCUMENTS

| | | | |
|---|---|---|---|
| 3,778,411 | 12/1973 | Emerick et al. | 528/353 |
| 3,861,956 | 1/1975 | Schwarcz | 528/353 |
| 3,981,847 | 9/1976 | Meyer et al. | 528/353 |
| 4,271,288 | 6/1981 | Woo | 528/353 |
| 4,358,579 | 11/1982 | Nimry et al. | 528/353 |

*Primary Examiner*—Lester L. Lee
*Attorney, Agent, or Firm*—Oblon, Fisher, Spivak, McClelland & Maier

[57] ABSTRACT

Polyamide acid obtained by reacting 2,3,5-tricarboxycyclopentane-acetic acid and a diamine in a solvent has a high stability in the form of a solution, has a high workability and is excellent in storage stability. Polyimide obtained by heating said polyamide acid is excellent in heat resistance, mechanical properties, electrical properties and chemical resistance.

17 Claims, 15 Drawing Figures

POLYAMIDE ACID, PROCESS FOR PRODUCING SAME AND POLYIMIDE OBTAINED THEREFROM

This invention relates to a novel polyamide acid, a process for producing said polyamide acid and a process for producing polyimide from said polyamide acid.

In general, polyimide exhibits a very excellent heat resistance and is quite useful as a starting material for film, electric wire coating, adhesive, coating material and the like used at high temperatures.

As polyimide, there has hitherto been known an aromatic polyimide obtained by reacting an aromatic tetracarboxylic acid dianhydride such as pyromellitic anhydride with a diamine in a solvent such as N,N-dimethylformamide, N,N-dimethylacetamide, N-methyl-2-pyrrolidone or the like to obtain a polyamide acid and then subjecting the latter to a dehydrating-ring closure by a method, for example, by heating it.

However, conventional aromatic polyimide has a fault that the aromatic polyamide acid used as a precursor is so poor in stability that when it is stored at room temperature the molecular weight decreases and it becomes insoluble in a solvent after the dehydration-ring closure has progressed to a small extent and it becomes in some cases turbid if stored for a long period of time in the form of a solution. In order to prevent this phenomenon, a solution of the conventional aromatic polyamide acid was usually necessary to store at 10° C. or below and hence, very inconvenient to handle.

With the aim of solving the above-mentioned problems, the present inventors have conducted extensive research. As a result, it has been found that since a special polyamide acid is kept soluble in a solvent even after a partial imidization has proceeded, it is quite stable and excellent in workability in the form of a solution, also excellent in storage stability. Further, it has also been found that polyimide obtained by subjecting the polyamide acid to dehydrating-ring closure is excellent in heat resistance, mechanical properties, electrical properties and chemical resistance.

An object of this invention is to provide a novel polyamide acid which is utilizable as a precursor for a polyimide excellent in heat resistance, mechanical properties, electrical properties, chemical properties, etc.

Another object of this invention is to provide a process for producing a polyimide excellent in heat resistance, mechanical properties, electrical properties, chemical resistance, etc.

According to this invention, there is provided a polyamide acid derived from 2,3,5-tricarboxycyclopentane-acetic acid or its anhydride and a diamine.

Further, this invention also provides a process for producing a polyamide acid which comprises reacting 2,3,5-tricarboxy-cyclopentane-acetic acid or its anhydride with a diamine in a solvent.

Moreover, this invention provides a polyimide obtained by heat-treating a polyamide acid derived from 2,3,5-tricarboxycyclopentane-acetic acid or its anhydride and a diamine and a process for producing said polyimide.

The 2,3,5-tricarboxycyclopentane-acetic acid used in this invention (hereinafter, referred to as TCA) can be produced, for example, by a process which comprises ozonolyzing dicyclopentadiene and then oxidizing it with hydrogen peroxide (British Pat. No. 872,355; J. Org. Chem. 28, 2537 (1963)), a process which comprises hydrating dicyclopentadiene and then oxidizing the resulting hydroxy-dicyclopentadiene with nitric acid (West German Pat. No. 1,078,120), etc. It is also possible to use TCA in the form of anhydride (usually, dianhydride).

The diamine to be reacted with said TCA or its anhydride is a compound represented by the general formula, $H_2N-R-NH_2$ wherein R is a divalent aromatic group, a divalent aliphatic hydrocarbon group or a divalent alicyclic hydrocarbon group.

In the above-mentioned general formula, R is preferably an aromatic hydrocarbon group represented by, for example,

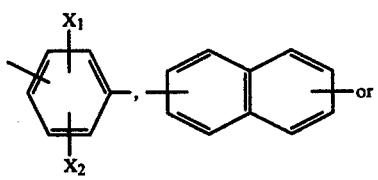

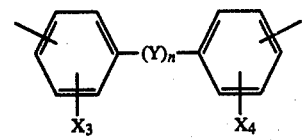

wherein $X_1$, $X_2$, $X_3$ and $X_4$, which may be identical or different, represent H or $CH_3$, Y represents $>CH_2$, $>C_2H_4$, $-O-$, $-S-$,

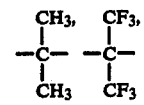

$>SO_2$ or $-CONH-$, and n represents 0 or 1; an aliphatic or alicyclic hydrocarbon group having 2-13 carbon atoms represented by, for example, $-(CH_2)_m-$ (m represents an integer of 2-9),

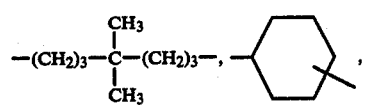

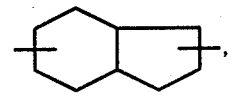

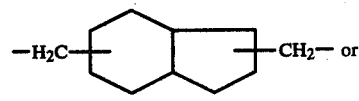

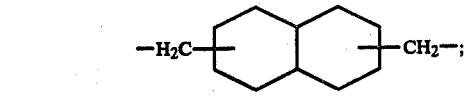

or a norbornane derivative hydrocarbon group. Among them, an aromatic hydrocarbon group is particularly preferable as R for further improving the heat resistance of the polyimide obtained by heat-treating the polyamide acid of this invention.

As said diamine, there may be used p-phenylenediamine, m-phenylenediamine, 4,4'-diaminodiphenylmethane, 4,4'-diaminodiphenylethane, 2,2-di(p-aminophenyl)-hexafluoropropane, benzidine, 4,4'-diaminodiphenyl sulfide, 4,4'-diaminodiphenyl sulfone, 4,4'-diaminodiphenyl ether, 1,5-diaminophthalene, 3,3'-dimethyl-4,4'-diaminobiphenyl 3,4'-diaminobenzanilide, 3,4'-diaminodiphenyl ether, m-xylylenediamine, p-xylylenediamine, ethylenediamine, propanediamine, tetramethylenediamine, hexamethylenediamine, heptamethylenediamine, octamethylenediamine, nonamethylenediamine, 4,4-dimethylheptamethylenediamine, 1,4-diaminocyclohexane, tetrahydrodicyclopentadienylenediamine, hexahydro-4,7-methanoindanylenedimethylenediamine, tricyclo[6,2,1,0$^{2.7}$]-undecylenedimethyldiamine and the like. They may be used either alone or in a mixture of two or more.

As the solvent for the reaction of this invention, those capable of dissolving both TCA or its anhydride and the diamine are preferred for increasing the molecular weight of polyamide acid. Concretely, aprotic dipole polar solvents such as N-methyl-2-pyrrolidone, N,N-dimethylformamide, N,N-dimethylacetamide, dimethyl sulfoxide, tetramethylurea, hexamethylphosphortriamide and the like are preferable. However, general organic solvents such as alcohols, phenols, ketones and ethers (for example, ethyl alcohol, isopropyl alcohol, ethylene glycol, propylene glycol, 1,4-butanediol, triethylene glycol, ethylene glycol monomethyl ether, phenol, cresol, methyl ethyl ketone, tetrahydrofuran and the like) are also usable.

The reaction between TCA or its anhydride and the diamine is preferably carried out at an equimolar ratio. However, somewhat larger or smaller amount may also be used, so long as the object of this invention can be achieved. In order to obtain a high molecular weight polyamide acid, the diamine is usually used in an amount of about 0.7-1.3 moles per mole of TCA or its anhydride. The solvent is used in an amount 0.5-20 times (by weight) the total amount of TCA or its anhydride and the diamine.

The reaction temperature at the time of producing the polyamide acid varies depending on which of TCA and TCA anhydride is used as the starting material. When TCA is used as the starting material, the reaction is carried out usually at 50°-300° C. for allowing the dehydrating-ring closure to proceed, and a temperature of 100°-250° C. is preferable because it is effective. When TCA anhydride is used as the starting material, the reaction is a polyaddition, and therefore, it is unnecessary to carry out the reaction at a high temperature. Usually, the reaction is carried out at 0°-100° C. The polyamide acid thus obtained is readily soluble in a solvent, and it is quite stable in the form of a solution because it is kept soluble in a solvent even after the polyamide acid has partially been imidized. According to infrared absorption spectrum, it has a stretching vibration of carbonyl group at 1600-1700 cm$^{-1}$ due to amide group.

The polyamide acid before the heat treatment preferably has an intrinsic viscosity ([$\eta$]) of 0.05 dl/g or more, particularly preferably 0.05-5 dl/g, as measured at 30° C. in N-methyl-2-pyrrolidone. The degree of polymerization (n) of the polyamide acid is usually about 10-5,000, preferably 20-1,000. To said polyamide acid may be added a stabilizer, such as an antioxidant, in an amount of about 0.01-5 parts by weight per 100 parts by weight of polyamide acid, and additives such as filler and the like may be added in an amount of, for example, about 1-100 parts by weight per 100 parts by weight of polyamide acid.

In producing a polyimide by subjecting the polyamide acid to dehydrating-ring closure, it is usual that the polyamide acid solution obtained by the above-mentioned reaction is directly heated and then subjected to dehydrating-ring closure while evaporating the solvent, or it is coagulated in a non-solvent for polyamide acid and then the coagulated polyamide acid is molded and subjected to dehydrating-ring closure by heating it, or the coagulated polyamide acid is again dissolved in a solvent, heated and then subjected to dehydrating-ring closure while evaporating the solvent. The heating temperature is preferably 100°-500° C. As the solvent used for again dissolving the polyamide acid, the above-mentioned aprotic dipole polar solvents, aqueous alkaline solutions and the like can be used.

The method of molding the polyimide varies depending upon uses of the polyimide. For example, a solution of a polyamide acid is coated on a support or a mat of glass fiber or the like is impregnated with said solution, and then it is gradually heat-treated until the temperature ultimately reaches 250°-400° C., whereby a transparent and tough polyimide film or a fiber-reinforced polyimide sheet can be obtained. According to infrared spectrum, the polyimide thus obtained has absorptions of stretching vibration of carbonyl group at two positions of 1650-1730 cm$^{-1}$ and 1730-1790 cm$^{-1}$ due to imide group.

The polyimide according to this invention exhibits excellent properties in heat resistance, mechanical properties, electrical properties, chemical resistance, adhesive properties and the like and is useful as, for example, a highly heat-resistant film, an adhesive, a coating material or the like. Concretely, it is useful as a base board for printed circuit, a base board for flexible circuit, a surface-protecting film or an insulating film between layers for semiconductor integral circuit element, a coating material for enamelled electric wire, various laminates, a gasket and the like.

This invention will be explained in more detail with reference to the accompanying drawings, and Examples. In the accompanying drawings, FIGS. 1, 3, 5, 6, 8, 10, 11, 12, 13, 14 and 15 are graphs illustrating the infrared absorption spectra of polyamide acids obtained in the Examples of this invention, and FIGS. 2, 4, 7 and 9 are graphs illustrating the infrared absorption spectra of polyimides obtained in the Examples of this invention.

Further, it should be understood that the Examples are only by way of illustration and not by way of limitation.

EXAMPLE 1

In a nitrogen atmosphere, 19.8 g (0.1 mole) of 4,4'-diaminodiphenylmethane was dissolved in 200 ml of N-methyl-2-pyrrolidone (hereinafter, simply referred to as NMP), and 22.4 g (0.1 mole) of TCA dianhydride was added at 25° C., and they were reacted for 2 hours while stirring the solution. Then, the reaction mixture was thrown into acetone to coagulate the polymer, and the coagulated polymer was dried to obtain 41 g of a polyamide acid powder. The intrinsic viscosity [$\eta$] of this polyamide acide was 0.58 dl/g as measured at 30° C. in NMP solvent. When the solution after the reaction was allowed to stand at 25° C. for 30 days, it exhibited neither drop in viscosity nor deposition of insoluble matter such as opacification or the like.

FIG. 1 illustrates the infrared absorption spectrum of the above-mentioned polyamide acid. It has an absorption due to amide carbonyl at 1660 cm$^{-1}$ and an absorption due to 1,4-disubstituted aromatic C—H out-of-plane deformation vibration at 815 cm$^{-1}$. Further, the —COOH group content of the polyamide acid was determined by alkali titration, and the degree of imidization was calculated from the —COOH content. As a result, the degree of imidization was found to be 0. The term "degree of imidization" used herein means the proportion of imide linkage in polyamide acid. Elementary analysis of the polyamide acid showed the following result: carbon 65.0%, hydrogen 5.1%, nitrogen 6.8% (calculated: carbon 65.4%, hydrogen 5.2%, nitrogen 6.6%).

Then, 20 g of this polyamide acid powder was dissolved in 30 g of N,N-dimethylacetamide to produce a 40% by weight solution. A portion of the solution was spin-coated on a glass plate and heat-treated first at 120° C. for 1 hour and then at 350° C. for 30 minutes to obtain a transparent polyimide film having a thickness of 20 μm. Properties of this film were measured to obtain the results shown in Table 1.

Figure 2:
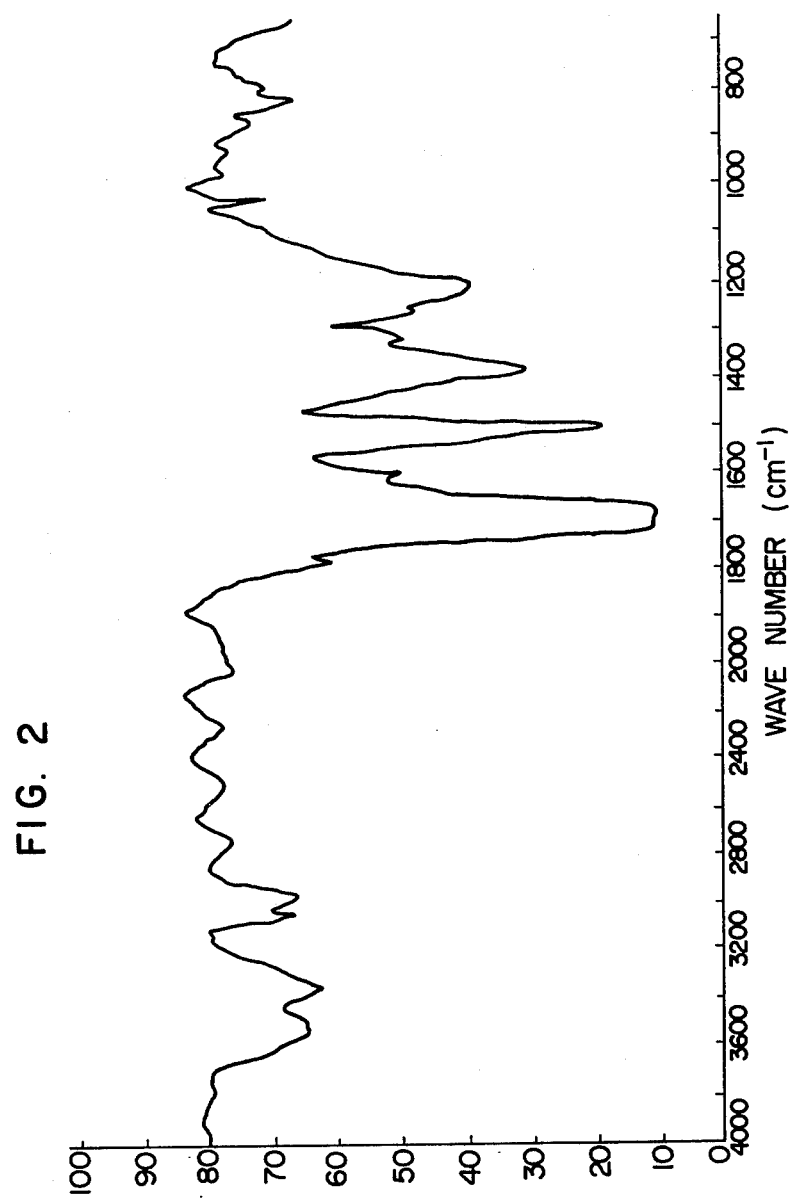

FIG. 2 illustrates the infrared absorption spectrum of the polyimide film. It has absorptions due to imide carbonyl in the vicinity of 1780 cm$^{-1}$ and 1700 cm$^{-1}$, an absorption due to aromatic C—H stretching vibration at 3040 cm$^{-1}$ and an absorption due to 1,4-disubstituted aromatic C—H out-of-plane deformation vibration at 815 cm$^{-1}$. Further, elementary analysis of the polyimide showed the following result: carbon 71.0%, hydrogen 4.6%, nitrogen 7.4% (calculated: carbon 71.5%, hydrogen 4.7%, nitrogen 7.2%).

EXAMPLE 2

The same reaction as in Example 1 was carried out, except that the 4,4'-diaminodiphenylmethane used in Example 1 was replaced by 20 g (0.1 mole) of 4,4'-diaminodiphenyl ether. When the reaction mixture was allowed to stand at 25° C. for 30 days, it showed neither drop in viscosity nor deposition of insoluble matter such as opacification or the like. Then, the solution after the reaction was thrown into acetone to coagulate the polymer, and the coagulated polymer was then dried to obtain 41 g of polyamide acid powder. The intrinsic viscosity [η] of this polyamide acid was 0.52 dl/g as measured at 30° C. in NMP.

Figure 3:
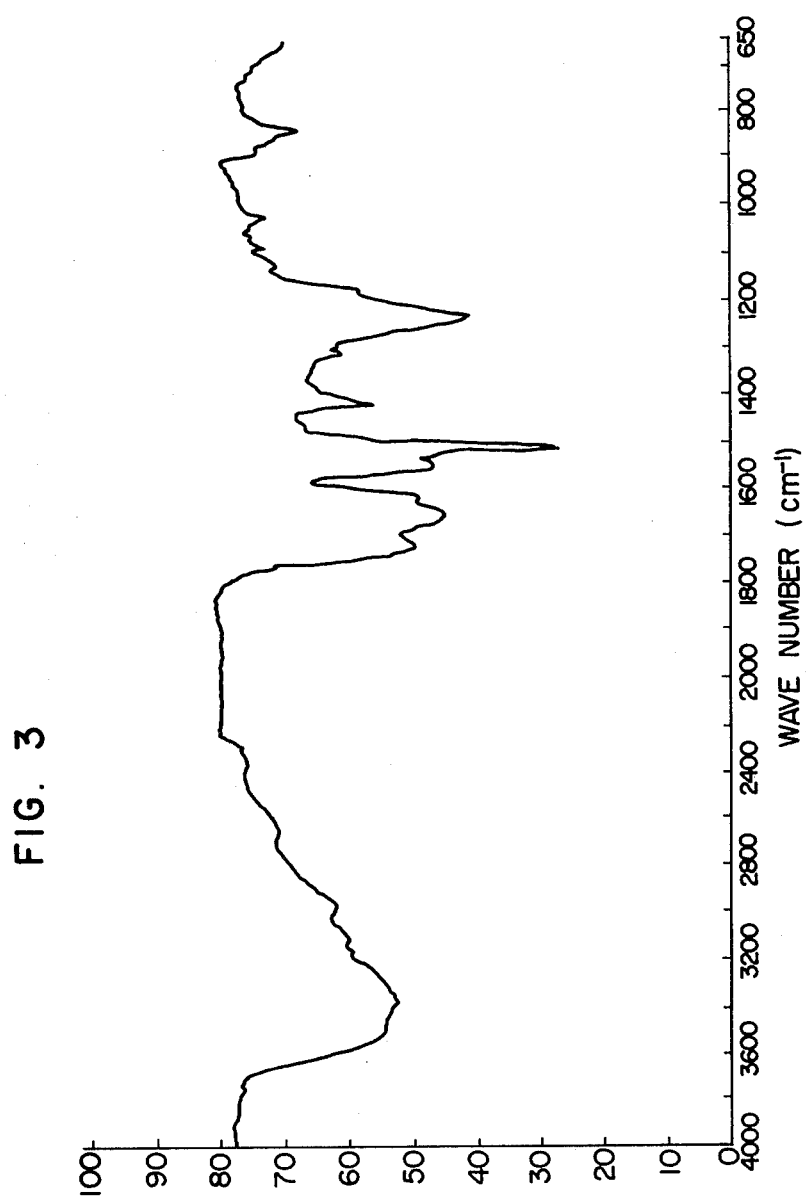

FIG. 3 illustrates the infrared absorption spectrum of this polyamide acid. It has an absorption due to amide carbonyl at 1660 cm$^{-1}$ and an absorption due to 1,4-disubstituted aromatic C—H out-of-plane deformation vibration at 840 cm$^{-1}$. Measurement of the degree of imidization showed that it was 0.

Elementary analysis of the polyamide acid showed the following result: carbon 61.8%, hydrogen 4.6%, nitrogen 6.8% (calculated: carbon 62.3%, hydrogen 4.7%, nitrogen 6.6%).

Then, this polyamide acid powder was treated in the same manner as in Example 1 to obtain a transparent polyimide film. Properties of this film were measured to obtain the results shown in Table 1.

Figure 4:
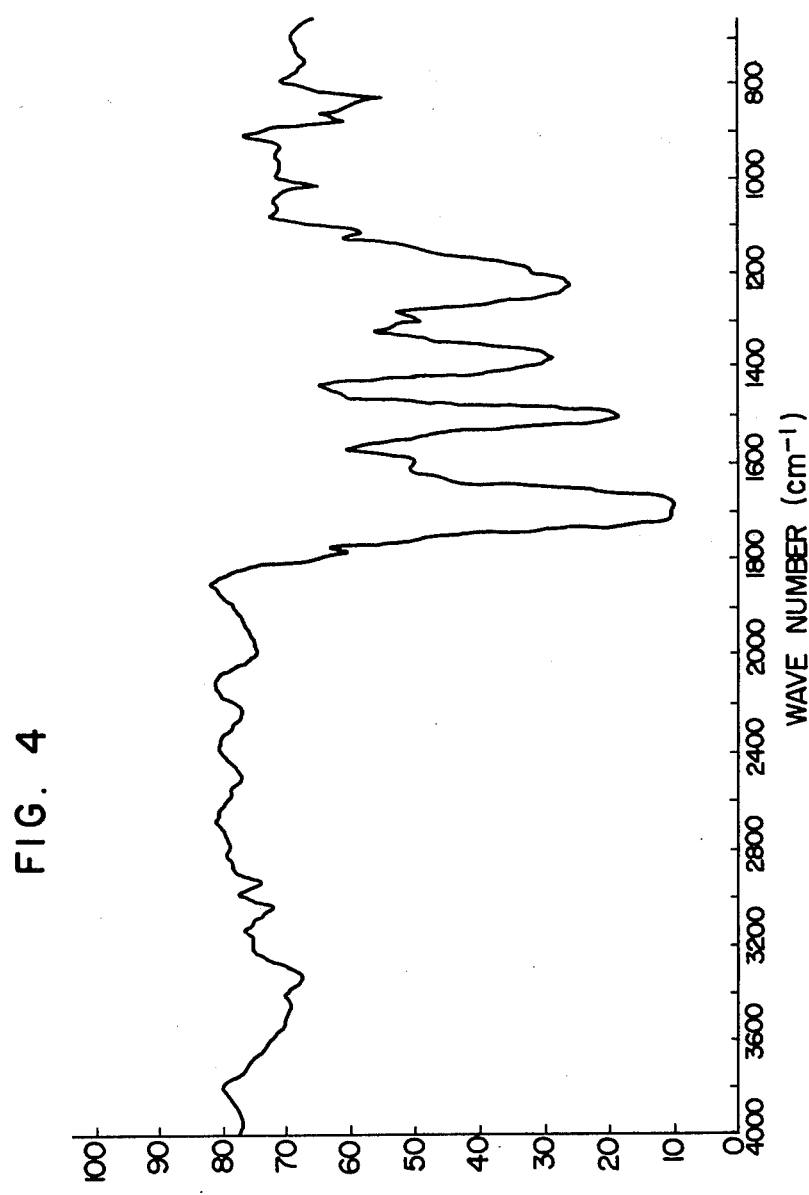

FIG. 4 illustrates the infrared absorption spectrum of this polyimide film. It has absorptions due to imide carbonyl group in the vicinity of 1780 cm$^{-1}$, and 1700 cm$^{-1}$, an absorption due to aromatic C—H stretching vibration at 3040 cm$^{-1}$, an absorption due to 1,4-disubstituted aromatic C—H out-of-plane deformation vibration at 825 cm$^{-1}$ and an absorption due to C—O—C antisymmetric strentching vibration in the vicinity of 1220 cm$^{-1}$. Elementary analysis of the polyimide showed the following result: carbon 67.5%, hydrogen 4.0%, nitrogen 7.4% (calculated: carbon 68.1%, hydrogen 4.1%, nitrogen 7.2%).

EXAMPLE 3

Twenty grams (0.1 mole) of 4,4'-diaminodiphenyl ether and 26 g (0.1 mole) of TCA were dissolved in 100 ml of NMP and reacted at 190° C. for 2 hours while distilling off the water formed by the reaction. Then, the reaction mixture was thrown into water to coagulate the polymer formed, and the coagulated polymer was dried to obtain 44 g of polyamide acid powder. The intrinsic viscosity [η] of this polyamide acid was 0.32 dl/g as measured at 30° C. in NMP, and the degree of imidization thereof was 30%.

Figure 5:
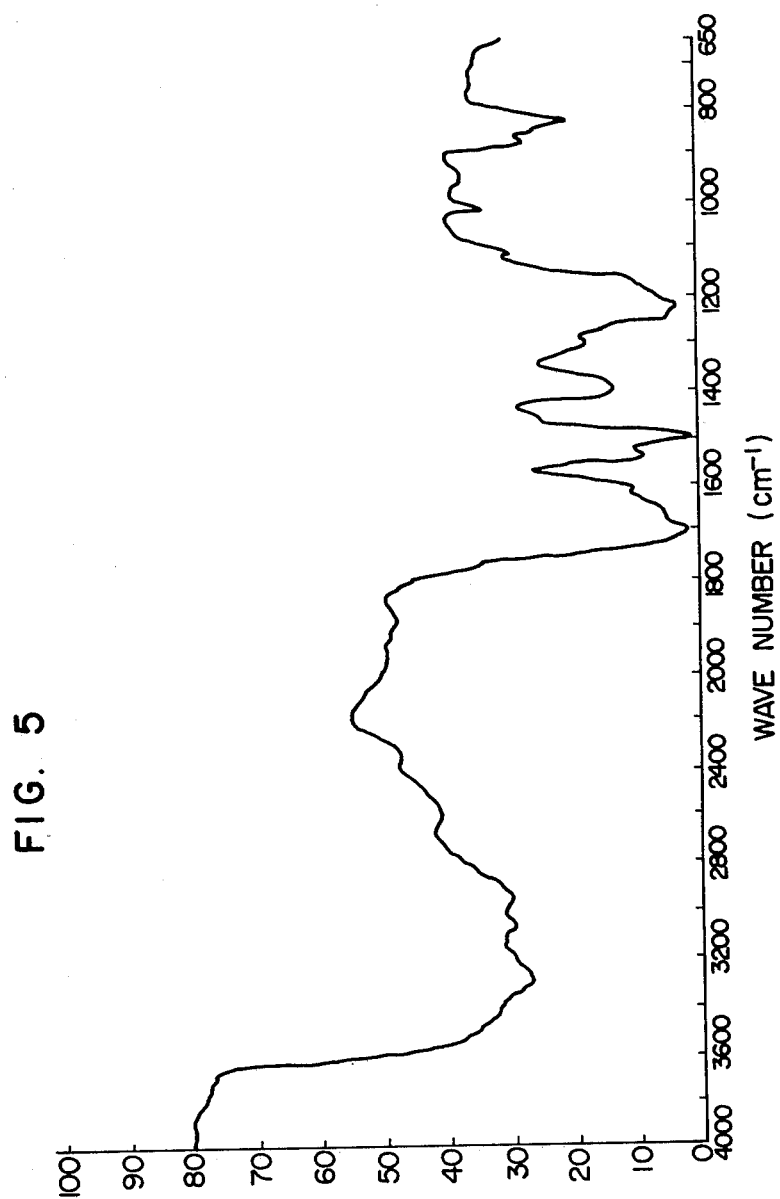

FIG. 5 illustrates the infrared absorption spectrum of this polyamide acid. It has an absorption due to amide carbonyl at 1660 cm$^{-1}$, absorptions due to imide carbonyl at 1780 cm$^{-1}$ and 1700 cm$^{-1}$ and an absorption due to 1,4-disubstituted aromatic C—H out-of-plane deformation vibration at 830 cm$^{-1}$.

The polyamide acid powder obtained above was dissolved in NMP to obtain a 40% by weight solution. When the resulting solution was allowed to stand at room temperature for 30 days, it showed neither drop in viscosity nor deposition of insoluble matter such as opacification or the like. Then, in the same manner as in Example 1, the solution was spin-coated and heat-treated to obtain a polyimide film. The infrared absorption spectrum of this polyimide film was the same as that of the polyimide of Example 2.

EXAMPLE 4

In a nitrogen atmosphere, 11.6 g (0.1 mole) of hexamethylenediamine was dissolved in 200 ml of NMP and stirred, to which 22.4 g (0.1 mole) of TCA dianhydride was added and suspended at 25° C. The suspension was heated to 50° C. and it was subjected to reaction for 3 hours. The reaction mixture was thrown into acetone to coagulate the polymer formed, and the coagulated polymer was dried to obtain 33 g of a polyamide acid powder.

The intrinsic viscosity [η] of this polyamide acid was 1.4 dl/g as measured at 30° C. in NMP containing 0.02% by weight of NaCl. When the solution after the reaction was allowed to stand at 25° C. for 30 days, it showed neither drop in viscosity nor deposition of insoluble matter such as opacification or the like.

Figure 6:
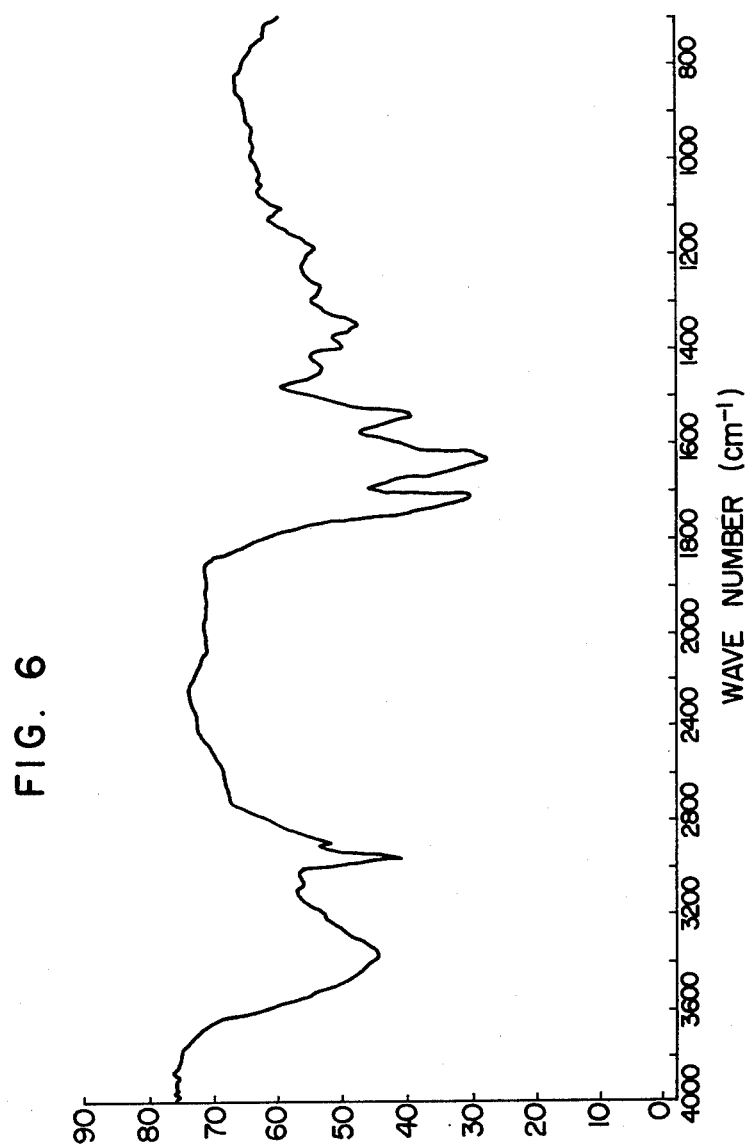

FIG. 6 illustrates the infrared absorption spectrum of the polyamide acid, which had an absorption due to amide carbonyl at 1640 cm$^{-1}$.

Further, the —COOH group content in the polyamide acid was determined by alkali titration, and the degree of imidation was calculated from the —COOH content. As a result, the degree of imidization was 0.

Elementary analysis of the polyamide acid showed the following result: carbon 56.1%, hydrogen 7.0%, nitrogen 8.4% (calculated: carbon 56.5%, hydrogen 7.1%, nitrogen 8.2%).

Then, 10 g of the polyamide acid powder was dissolved in 30 g of N,N-dimethylformamide to give a 25% by weight solution, and a portion of the solution was spin-coated on a glass plate and heat-treated first at 120° C. for 1 hour, then at 200° C. for 1 hour, and subsequently at 350° C. for 30 minutes to obtain a light brown, transparent polyimide film having a thickness of 20 μm. Properties of this compound were measured to obtain the results shown in Table 1.

Figure 7:
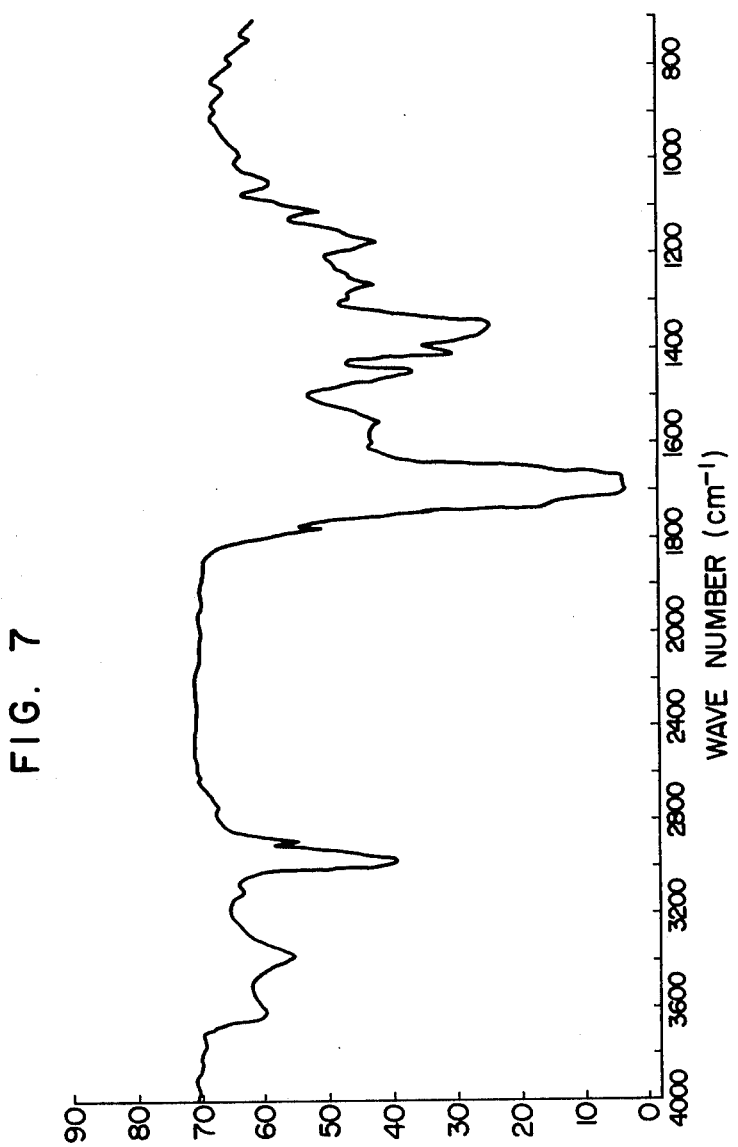

FIG. 7 illustrates the infrared absorption spectrum of this polyimide compound, in which absorptions due to polyimide carbonyl are observed at 1780 cm$^{-1}$ and 1700 cm$^{-1}$. Elementary analysis of the polyimide showed the following result: carbon 62.8%, hydrogen 6.7%, nitrogen 9.4% (calculated: carbon 63.2%, hydrogen 6.6%, nitrogen 9.2%).

matter such as opacification or the like, even after being allowed to stand at 25° C. for 30 days.

Then, in the same manner as in Example 4, this solution was spin-coated and heat-treated to prepare a polyimide film. The infrared absorption spectrum of this polyimide film was the same as that of the polyimide of Example 4.

TABLE 1

| Property | Method of measurement | Example 1 | Example 2 | Example 4 | Example 5 |
|---|---|---|---|---|---|
| Heat decomposition temperature* (°C.) | Thermogravimetry, in air, at temperature elevation rate of 10° C./min. | 430–440 | 430–440 | 430–440 | 430–440 |
| Tensile strength (kg/cm$^2$) | JIS K 6911 (25° C.) | 1,100 | 1,100 | — | — |
| Elongation (%) | " | 10 | 10 | — | — |
| Dielectric constant | ASTM D 150 (25° C.) (lKHz) | 3.0 | — | 2.5 | 3.0 |
| Dielectric tangent | ASTM D 150 (25° C.) (lKHz) | 0.0035 | 0.0050 | 0.006 | 0.007 |
| Volume resistivity (Ω · cm) | ASTM D 257 (25° C.) | >10$^{18}$ | >10$^{18}$ | >10$^{18}$ | >10$^{18}$ |

Note: *Temperature at which the rate of weight loss was Δ3%/10° C.

EXAMPLE 5

The same reaction as in Example 4 was carried out, except that the hexamethylenediamine used in Example 4 was replaced by 19.4 g (0.1 mole) of hexahydro-4,7-methanoindanylene-dimethylenediamine. Then, the reaction mixture was thrown into acetone to coagulate the polymer formed, and the coagulated polymer was dried to obtain 41 g of a polyamide acid powder.

The intrinsic viscosity [η] of this polyamide acid was 0.47 dl/g as measured at 30° C. in NMP containing 0.02% by weight of NaCl. When the solution after the reaction was allowed to stand at 25° C. for 30 days, it showed neither drop in viscosity nor deposition of insoluble matter such as opacification or the like.

Figure 8:
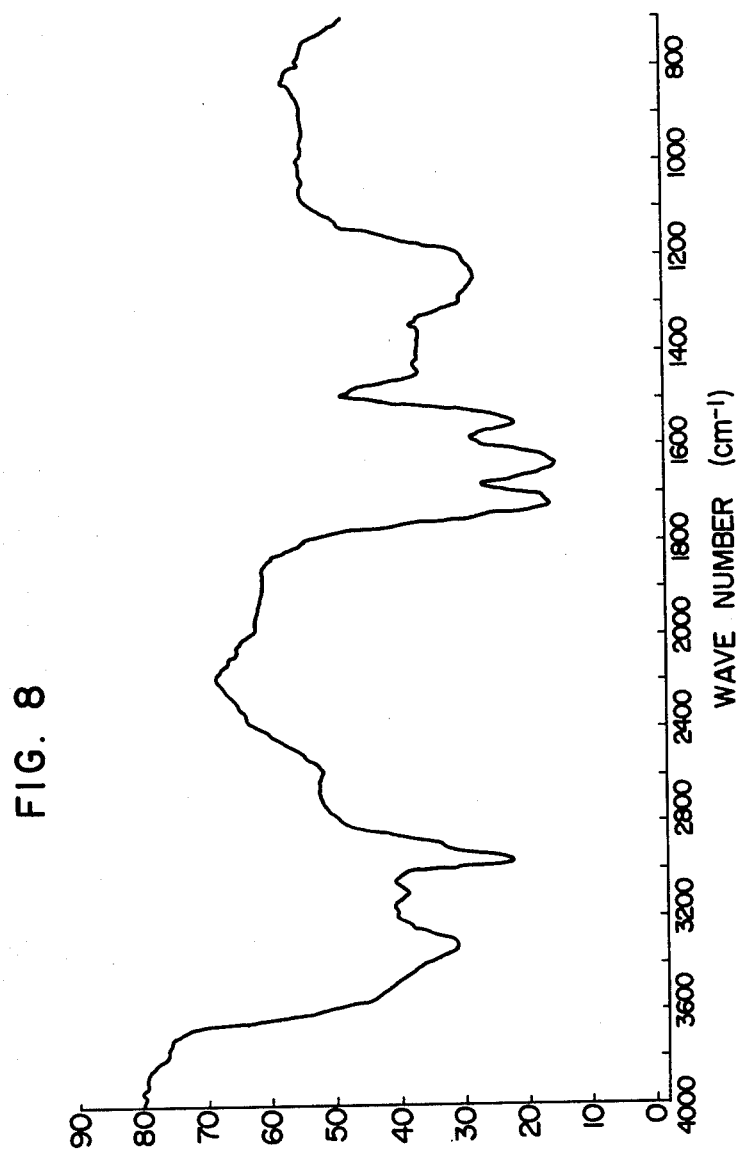
Figure 9:
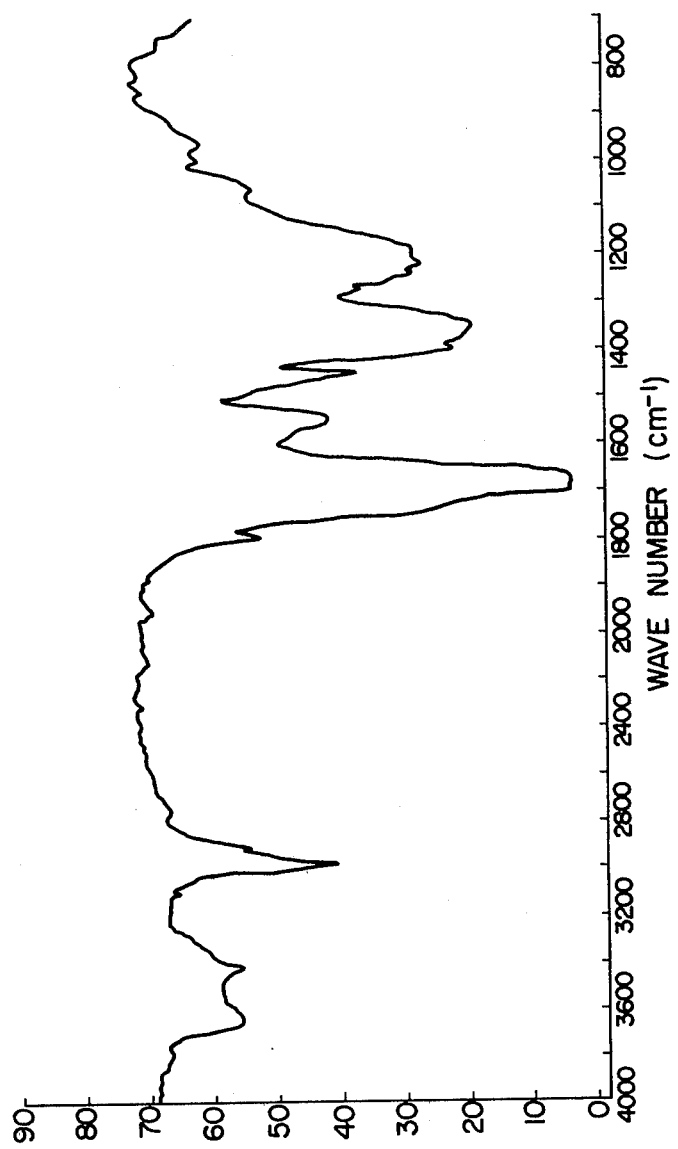

FIG. 8 illustrates the infrared absorption spectrum of the polyamide acid, in which an absorption due to amide carbonyl is observed at 1640 cm$^{-1}$. The degree of imidization of the polyamide acid was 0.

Elementary analysis of the polyamide acid showed the following result: carbon 68.7%, hydrogen 6.7%, nitrogen 7.5% (calculated: carbon 69.1%, hydrogen 6.8%, nitrogen 7.3%).

EXAMPLE 6

In 100 ml of NMP were dissolved 11.6 g (0.1 mole) of hexamethylenediamine and 26 g (0.1 mole) of TCA, and they were reacted at 190° C. for 2 hours while distilling off the water formed by the reaction. Then, the reaction mixture was thrown into water to coagulate the polymer formed and the coagulated polymer was dried to obtain 30 g of a polyamide acid powder. The intrinsic viscosity [η] of this polyamide acid was 0.20 dl/g as measured at 30° C. in NMP containing 0.02% by weight of NaCl. The degree of imidization of the polyamide acid was 56%.

Figure 10:
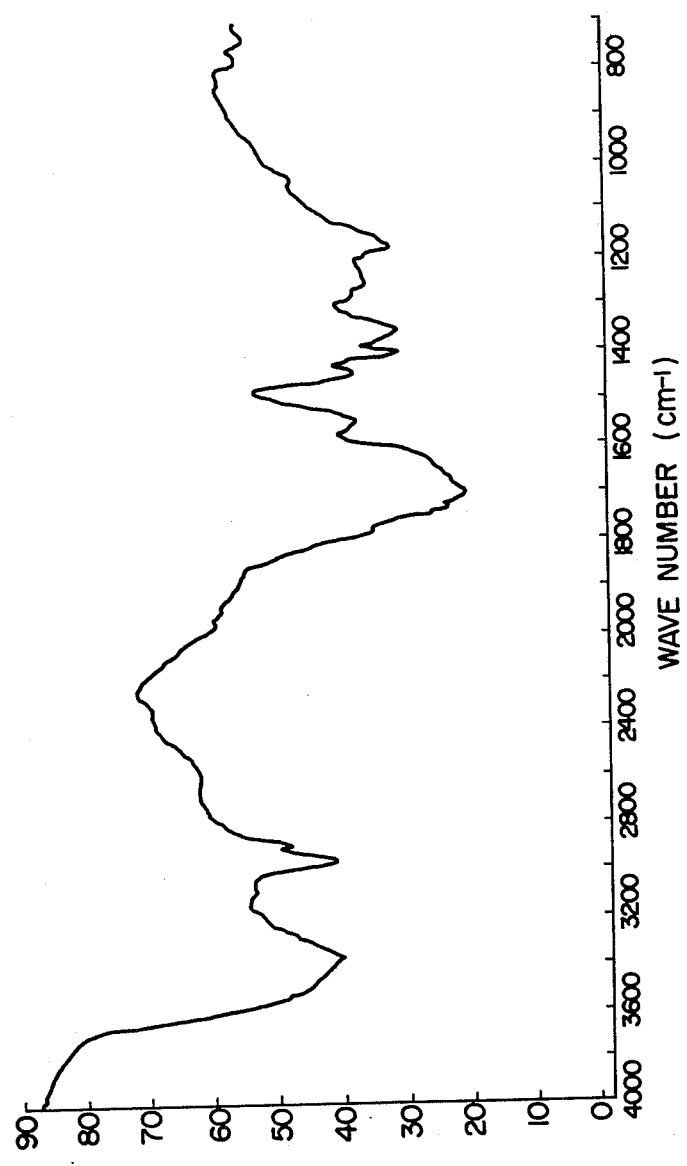

FIG. 10 illustrates the infrared absorption spectrum of this polyamide acid, where an absorption due to amide carbonyl is observed at about 1640 cm$^{-1}$ and an absorption due to imide carbonyl is observed at 1780 cm$^{-1}$. A solution prepared by dissolving 25% by weight of this polyamide acid powder in NMP showed neither drop in viscosity nor deposition of insoluble

EXAMPLE 7

Reaction was carried out in the same manner as in Example 1, except that the 4,4'-diaminodiphenylmethane used in Example 1 was replaced by 21.6 g (0.1 mole) of 4,4'-diaminodiphenyl sulfide and the NMP solvent used in Example 1 was replaced by 200 ml of dimethylacetamide (hereinafter, referred to as DMAc). Then the reaction mixture was thrown into acetone to coagulate the polymer formed, and the coagulated polymer was dried to obtain 18 g of a polyamide acid powder. The intrinsic viscosity [η] of this polyamide acid was 0.82 dl/g as measured at 30° C. in NMP. When the solution after the reaction was allowed to stand at 25° C. for 30 days, neither drop in viscosity nor deposition of insoluble matter was observed.

Figure 11:
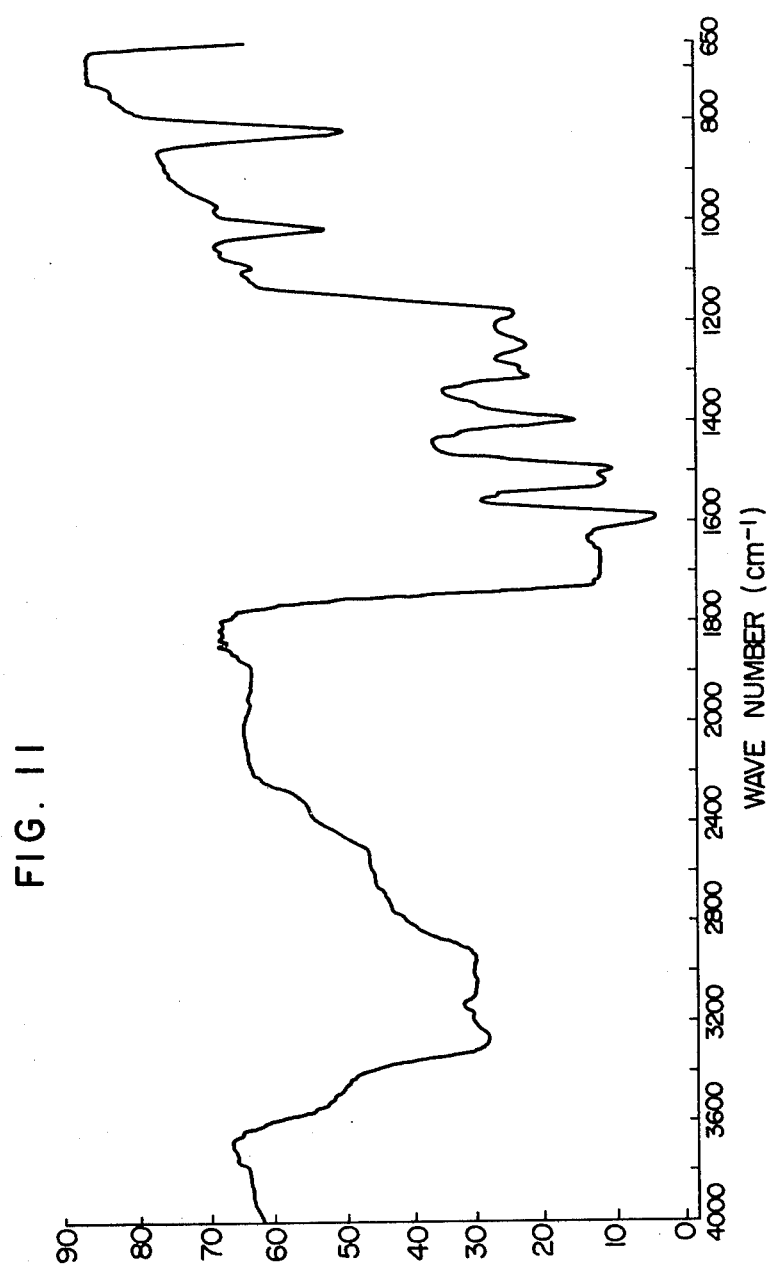

FIG. 11 illustrates the infrared absorption spectrum of this polyamide acid, where an absorption due to amide carbonyl was observed at 1660 cm$^{-1}$ and an absorption due to 1,4-disubstituted aromatic C—H out-of-plane deformation vibration was observed at 840 cm$^{-1}$. The degree of imidization of the polyamide acid was 0.

Elementary analysis of the polyamide acid showed the following result: carbon 59.7%, hydrogen 4.7%, nitrogen 6.3% (calculated: carbon 60.6%, hydrogen 4.6%, nitrogen 6.4%).

Then, the polyamide acid powder was treated in the same manner as in Example 1 to obtain a transparent polyimide film. The infrared absorption spectrum of this polyimide film had absorptions due to imide carbonyl group in the vicinity of 1780 cm$^{-1}$ and 1700 cm$^{-1}$, an absorption due to aromatic C—H stretching vibration at 3040 cm$^{-1}$ and an absorption due to 1,4-disubstituted aromatic C—H out-of-plane deformation vibration at 825 cm$^{-1}$. Elementary analysis of the polyimide showed the following result: carbon 64.8%, hydrogen 4.0%, nitrogen 7.2% (calculated: carbon 65.4%, hydrogen 4.0%, nitrogen 6.9%).

EXAMPLE 8

Reaction was carried out in the same manner as in Example 7, except that the 4,4'-diaminodiphenyl sulfide used in Example 7 was replaced by 10.8 g (0.1 mole) of p-phenylenediamine. The reaction mixture was thrown into acetone to coagulate the polymer formed, and the coagulated polymer was dried to obtain 27 g of a polyamide acid powder. The intrinsic viscosity [η] of this polyamide acid was 0.73 dl/g as measured at 30° C. in NMP. The solution after the reaction showed neither drop in viscosity nor deposition of insoluble matter such as opacification even after being allowed to stand at 25° C. for 30 days.

Figure 12:
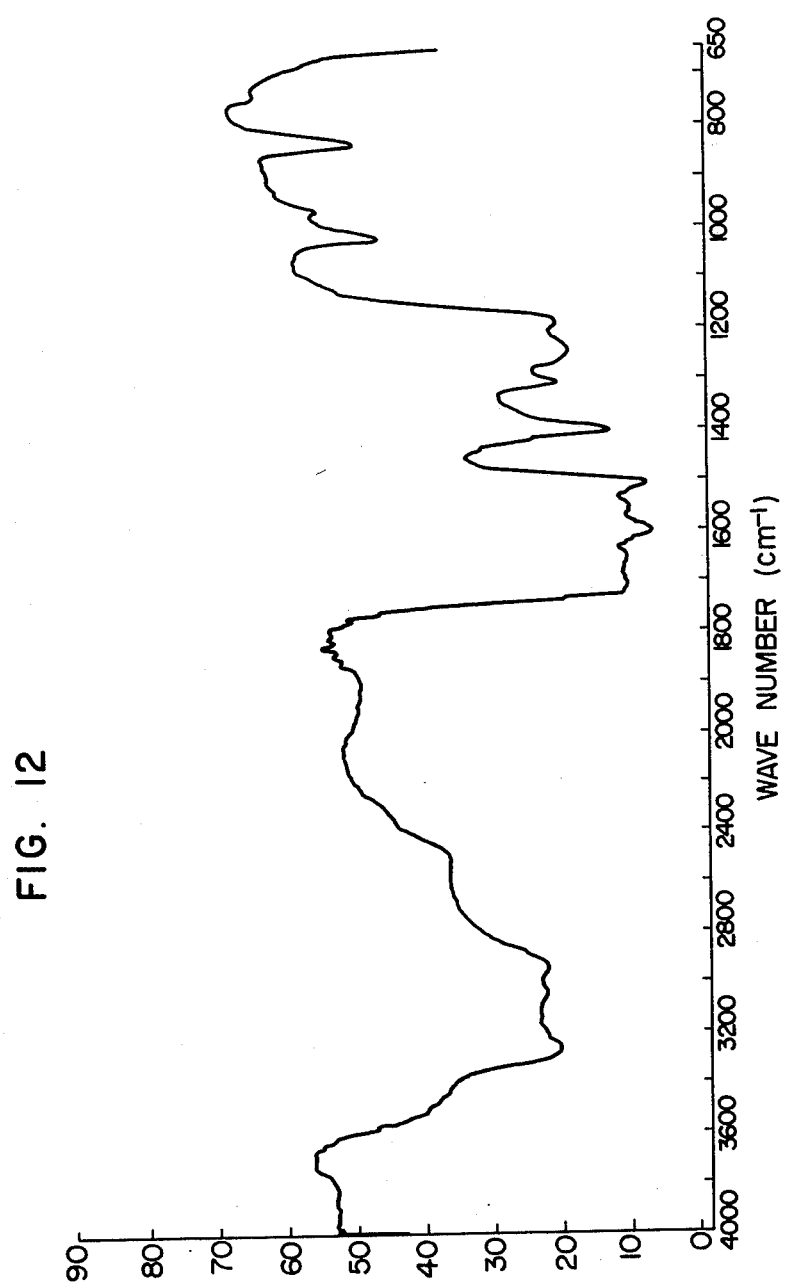

FIG. 12 illustrates the infrared absorption spectrum of this polyamide acid, where an absorption due to amide carbonyl is observed at 1660 cm$^{-1}$ and an absorption due to 1,4-disubstituted aromatic C—H out-of-plane deformation vibration is observed at 840 cm$^{-1}$. The degree of imidization of the polyamide acid was 0.

Elementary analysis of the polyamide acid showed the following result: carbon 58.4%, hydrogen 5.0%, nitrogen 8.3% (calculated: carbon 57.8%, hydrogen 4.9%, nitrogen 8.4%).

Then, the polyamide acid powder was treated in the same manner as in Example 1 to obtain a transparent polyimide film. The infrared absorption spectrum of the polyimide film had absorptions due to imide carbonyl group in the vicinity of 1780 cm$^{-1}$ and 1700 cm$^{-1}$, an absorption due to aromatic C—H stretching vibration at 3040 cm$^{-1}$ and an absorption due to 1,4-disubstituted aromatic C—H out-of-plane deformation vibration at 825 cm$^{-1}$. Elementary analysis of the polyimide showed the following result: carbon 65.3%, hydrogen 4.0%, nitrogen 9.7% (calculated: carbon 64.9%, hydrogen 4.1%, nitrogen 9.5%).

EXAMPLE 9

Reaction was carried out in the same manner as in Example 7, except that the 4,4'-diaminodiphenyl sulfide used in Example 7 was replaced by 10.8 g (0.1 mole) of m-phenylenediamine. Then, the reaction mixture was thrown into acetone to coagulate the polymer formed, and the coagulated polymer was dried to obtain 41 g of a polyamide acid powder. The intrinsic viscosity [η] of this polyamide acid was 0.44 dl/g as measured at 30° C. in NMP. The solution after the reaction showed neither drop in viscosity nor deposition of insoluble matter such as opacification or the like even after being allowed to stand at 25° C. for 30 days.

Figure 13:
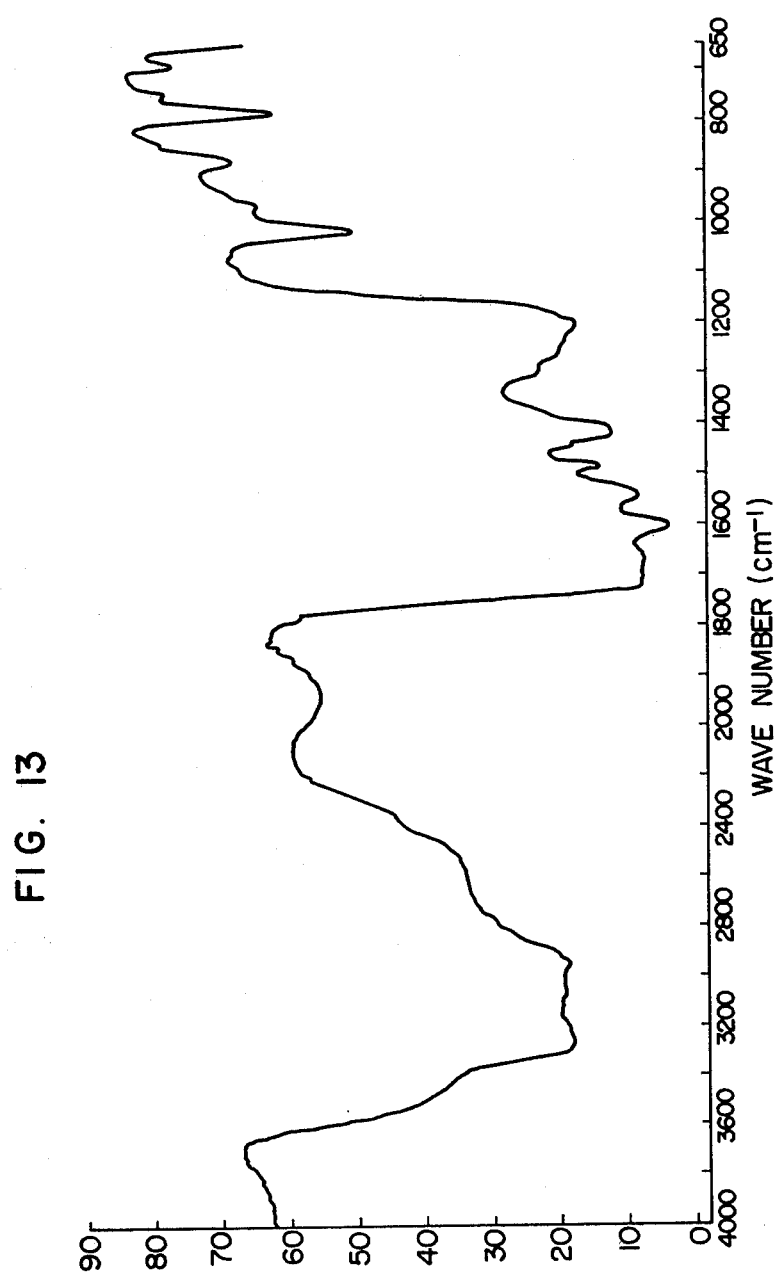

FIG. 13 illustrates the infrared absorption spectrum of this polyamide acid, where an absorption due to amide carbonyl is observed at 1660 cm$^{-1}$. The degree of imidization of the polyamide acid was 0.

Elementary analysis of the polyamide acid showed the following result: carbon 57.6%, hydrogen 4.8%, nitrogen 8.6% (calculated: carbon 57.8%, hydrogen 4.9%, nitrogen 8.4%).

Then, the polyamide acid powder was treated in the same manner as in Example 1 to prepare a transparent polyimide film. The infrared absorption spectrum of this polyimide film had absorptions due to imide carbonyl group in the vicinity of 1780 cm$^{-1}$ and 1700 cm$^{-1}$ and an absorption due to aromatic C—H stretching vibration at 3040 cm$^{-1}$. Elementary analysis of the polyimide showed the following result: carbon 65.4%, hydrogen 4.2%, nitrogen 9.4% (calculated: carbon 64.9%, hydrogen 4.1%, nitrogen 9.5%).

EXAMPLE 10

Reaction was carried out in the same manner as in Example 7, except that the 4,4'-diaminodiphenyl sulfide used in Example 7 was replaced by 13.6 g (0.1 mole) of p-xylenediamine. Then, the reaction mixture was thrown into acetone to coagulate the polymer formed, and the coagulated polymer was dried to obtain 41 g of polyamide acid powder. The intrinsic viscosity [η] of this polyamide acid was 0.32 dl/g as measured at 30° C. in NMP. The solution after the reaction showed neither drop in viscosity nor deposition of insoluble matter, even after being allowed to stand at 25° C. for 30 days.

Figure 14:
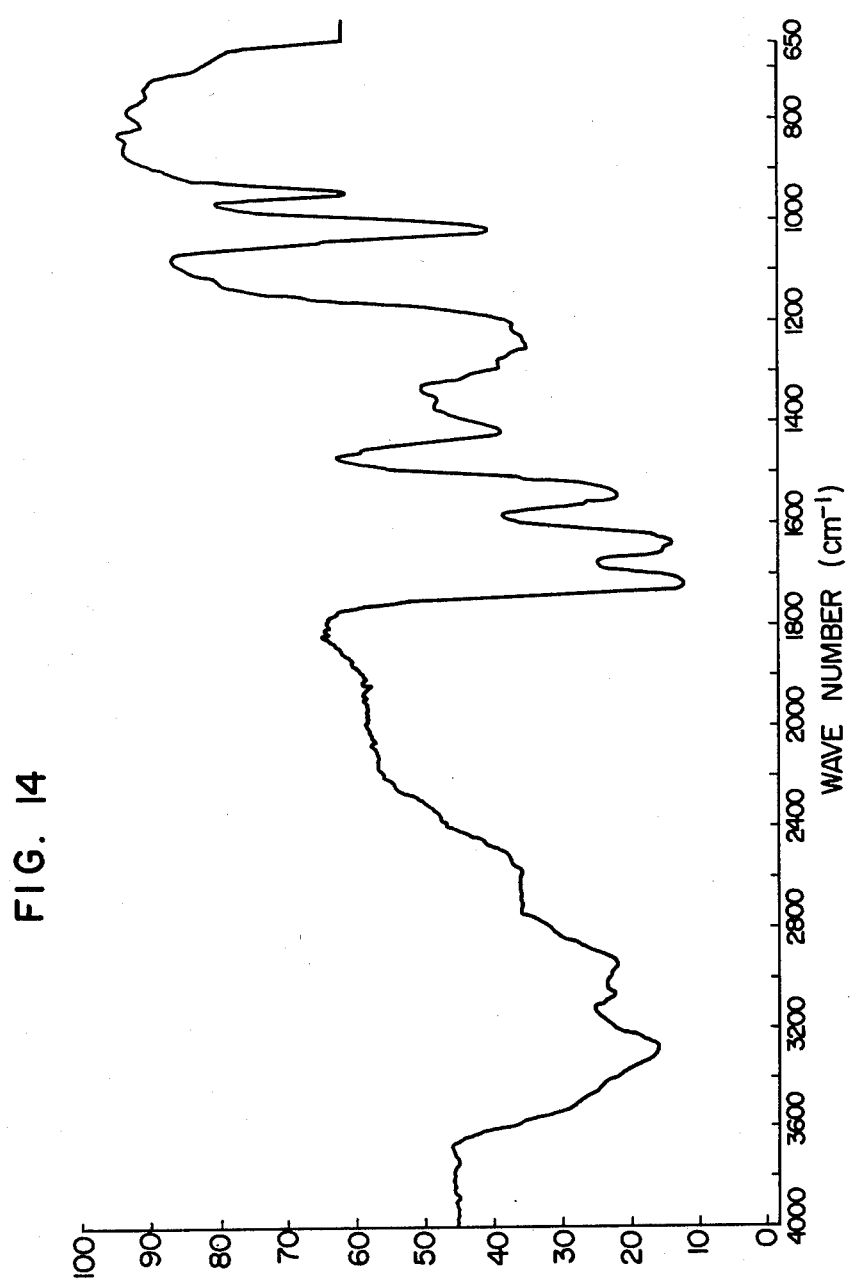

FIG. 14 illustrates the infrared absorption spectrum of the polyamide acid, where an absorption due to amide carbonyl is observed at 1660 cm$^{-1}$ and an absorption due to 1,4-disubstituted aromatic C—H out-of-plane deformation vibration is observed at 840 cm$^{-1}$. Further, the degree of imidization of the polyamide acid was 0.

Elementary analysis of the polyamide acid showed the following result: carbon 60.8%, hydrogen 5.6%, nitrogen 7.3% (calculated: carbon 60.0%, hydrogen 5.6%, nitrogen 7.8%).

Then, the polyamide acid powder was treated in the same manner as in Example 1 to prepare a transparent polyimide film. In the infrared absorption spectrum of the polyimide film, absorptions due to imide carbonyl group were observed in the vicinity of 1780 cm$^{-1}$ and 1700 cm$^{-1}$, an absorption due to aromatic C—H stretching vibration was observed at 3040 cm$^{-1}$, and an absorption due to 1,4-disubstituted aromatic C—H out-of-plane deformation vibration was observed at 825 cm$^{-1}$. Elementary analysis of the polyimide showed the following result: carbon 66.4%, hydrogen 5.1%, nitrogen 8.7% (calculated: carbon 66.7%, hydrogen 5.0%, nitrogen 8.6%).

EXAMPLE 11

Reaction was carried out in the same manner as in Example 7, except that the 4,4'-diaminodiphenyl sulfide used in Example 7 was replaced with 13.6 g (0.1 mole) of m-xylylenediamine. Then, the reaction mixture was thrown into acetone to coagulate the polymer formed, and the coagulated polymer was dried to obtain 41 g of a polyamide acid powder. The intrinsic viscosity [η] of this polyamide acid was 0.52 dl/g as measured at 30° C. in NMP. The solution after the reaction showed neither drop in viscosity nor deposition of insoluble matter such as opacification, even after being allowed to stand at 25° C. for 30 days.

Figure 15:
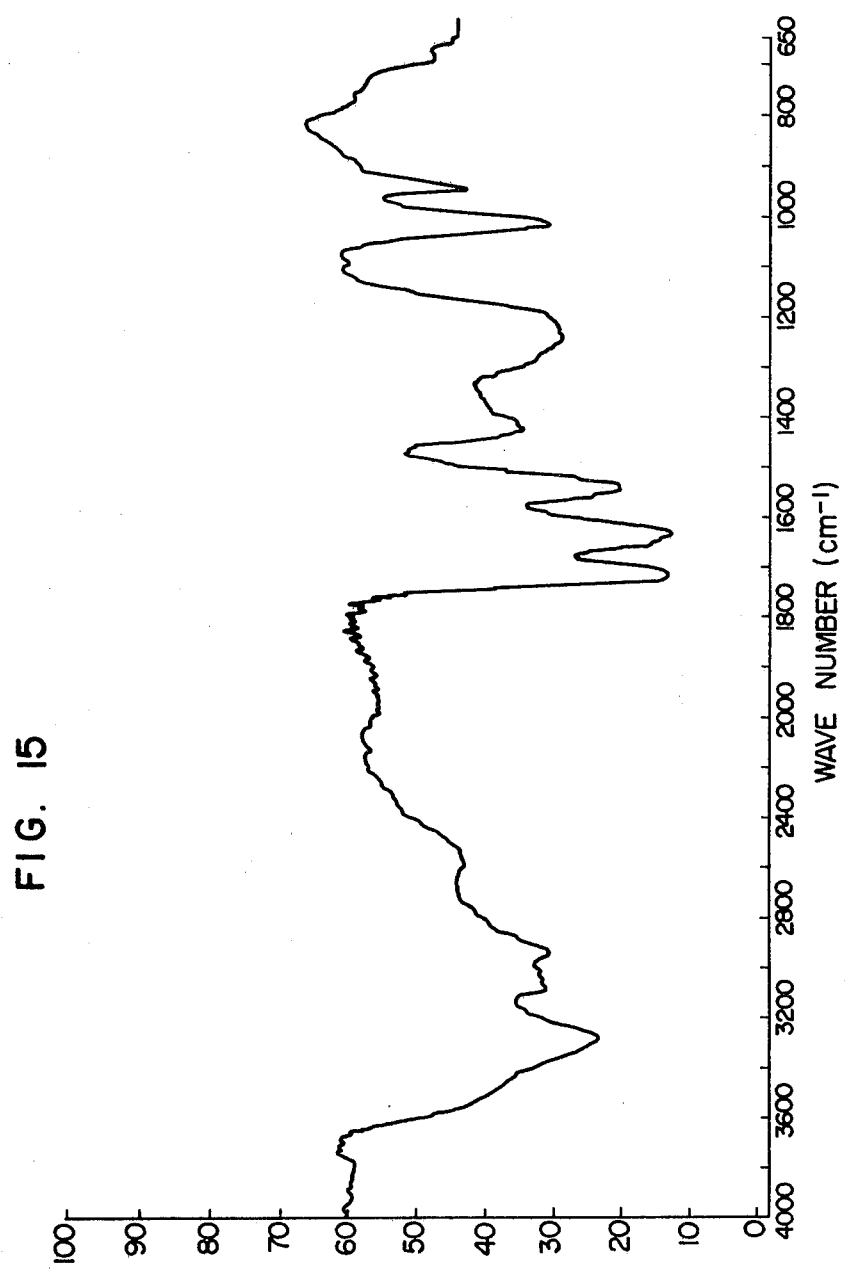

FIG. 15 illustrates the infrared absorption spectrum of the polyamide acid, where an absorption due to amide carbonyl was observed at 1660 cm$^{-1}$. Further, the degree of imidization of the polyamide acid was 0.

Elementary analysis of the polyamide acid showed the following result: carbon 60.8%, hydrogen 5.6%, nitrogen 7.2% (calculated: carbon 60.0%, hydrogen 5.6%, nitrogen 7.8%).

Then, the polyamide acid powder was treated in the same manner as in Example 1 to prepare a transparent polyimide film. In the infrared absorption specturm of the polyimide film, absorptions due to imide carbonyl group are observed in the vicinity of 1780 cm$^{-1}$ and 1700 cm$^{-1}$, and an absorption due to aromatic C—H stretching vibration was observed at 3040 cm$^{-1}$. Elementary analysis of the polyimide showed the following result: carbon 66.5%, hydrogen 5.2%, nitrogen 8.4% (calculated: carbon 66.7%, hydrogen 5.0%, nitrogen 8.6%).

COMPARATIVE EXAMPLE 1

In the same manner as in Example 1, 21.8 g (0.1 mole) of pyromellitic anhydride and 19.8 g of diaminodiphenyl ether were reacted in 260 g of dimethylacetamide.

The intrinsic viscosity [η] of the polyamic acid thus obtained was 3.37 dl/g as measured at 30° C. in NMP. When the solution after the reaction was allowed to stand at 25° C. for 3 days. The intrinsic viscosity [η] dropped to 2.30 dl/g, and indicated a decrease in molecular weight. It is understandable from this fact that this polyamide acid is quite poor in storage stability.

What is claimed is:

1. A polyamide acid that is the reaction product of 2,3,5-tricarboxycyclopentyl-acetic acid or its anhydride and a diamine, which has an absorption of a stretching vibration of a carbonyl group at 1,600–1,700 cm$^{-1}$ due to an amide group in its infrared absorption spectrum.

2. A polyamide acid according to claim 1, wherein said diamine is a diamine represented by H$_2$N—R—NH$_2$, wherein R is a divalent aromatic group, a divalent aliphatic hydrocarbon group, or a divalent alicyclic hydrocarbon group.

3. A polyamide acid according to claim 2, wherein R is an aromatic group represented by:

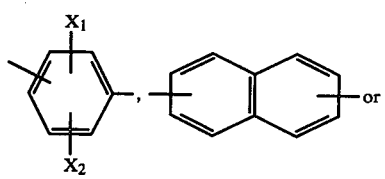

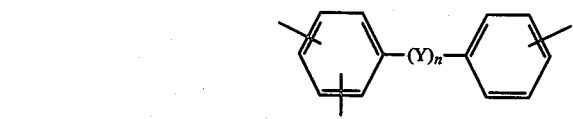

wherein X$_1$, X$_2$, X$_3$ and X$_4$, which may be identical or different, represent H or CH$_3$, Y represents >CH$_2$, >C$_2$H$_4$, —O—, —S—,

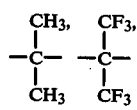

>SO$_2$ or —CONH—; and n represents 0 or 1; an aliphatic hydrocarbon group represented by —(CH$_2$)$_m$— in which m represents an integer of 2-9 or

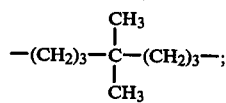

an alicyclic hydrocarbon group represented by

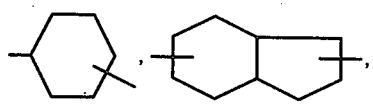

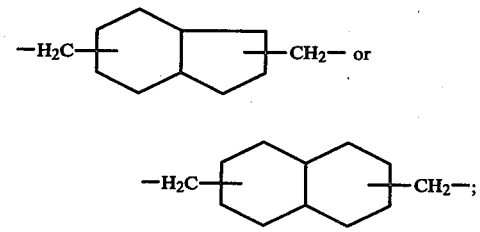

or a norbornane hydrocarbon group.

4. A polyamide acid according to claim 1, wherein said diamine is p-phenylenediamine, m-phenylenediamine, 4,4'-diaminodiphenylmethane, 4,4'-diaminodiphenylethane, 2,2-di-(p-aminophenyl)-hexafluoropropane, benzidine, 4,4'-diaminodiphenyl sulfide, 4,4'-diaminodiphenyl sulfone, 4,4'-diaminodiphenyl ether, 1,5-diaminonaphthalene, 3,3'-dimethyl-4,4'-diaminobiphenyl, 3,4'-diaminobenzanilide, 3,4'-diaminodiphenyl ether, m-xylylenediamine, p-xylylenediamine, ethylenediamine, propanediamine, tetramethylenediamine, hexamethylenediamine, heptamethylenediamine, octamethylenediamine, nonamethylenediamine, 4,4-dimethylheptamethylenediamine, 1,4-diaminocyclohexane, tetrahydrodicyclopentadienylenediamine, hexahydro-4,7-methanoindanylenedimethylenediamine or tricyclo[6,2,1,0$^{2.7}$]-undecylenedimethyldiamine.

5. A polyamide acid according to claim 1, wherein the intrinsic viscosity of said polyamide acid is 0.05 dl/g or more as measured at 30° C. in N-methyl-2-pyrrolidone.

6. A polyamide acid according to claim 1, wherein the intrinsic viscosity of said polyamide acid is 0.05–5 dl/g as measured at 30° C. in N-methyl-2-pyrrolidone.

7. A process for producing a polyamide acid which comprises reacting 2,3,5-tricarboxycyclopentyl-acetic acid or its anhydride and a diamine in an organic solvent, wherein said acetic acid or its anhydride and said diamine are present in a molar ratio of 1:0.7–1.3, and said reaction is carried out at 0°–300° C.

8. A process according to claim 7, wherein the molar ratio between 2,3,5-tricarboxycyclopentyl-acetic acid or its anhydride and a diamine is 1.

9. A process according to claim 7, wherein the amount of the solvent is 0.5–20 parts by weight per part by weight of the total amount of 2,3,5-tricarboxycyclopentyl-acetic acid or its anhydride and a diamine.

10. A process according to claim 7, wherein 2,3,5-tricarboxycyclopentyl-acetic acid and a diamine are reacted at 50°–300° C.

11. A process according to claim 7, wherein 2,3,5-tricarboxycyclopentyl-acetic acid anhydride and a diamine are reacted at 0°–100° C.

12. A process according to claim 7, wherein said diamine is a diamine represented by H$_2$N—R—NH$_2$, wherein R is a divalent aromatic group, a divalent aliphatic hydrocarbon group, or a divalent alicyclic hydrocarbon group.

13. A process according to claim 12, wherein R is a divalent aromatic group represented by:

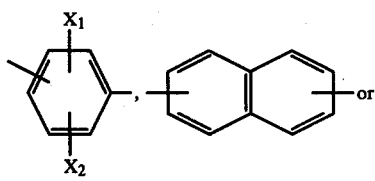, 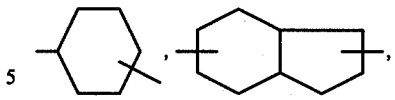,

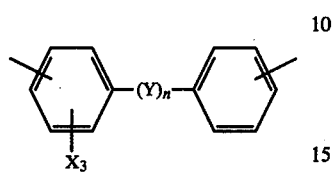

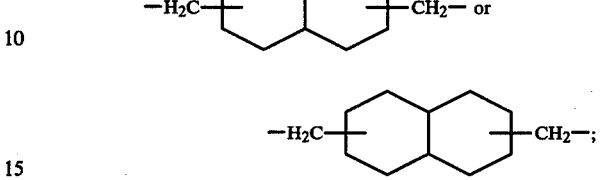

wherein $X_1$, $X_2$, $X_3$ and $X_4$, which may be identical or different, represent H or $CH_3$, Y represents $>CH_2$, $>C_2H_4$, —O—, —S—,

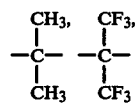

$>SO_2$ or —CONH—, and n represents 0 or 1; an aliphatic hydrocarbon group represented by $-(CH_2)_m-$ in which m represents an integer of 2–9 or

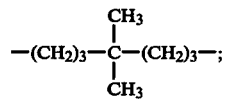

an alicyclic hydrocarbon group represented by or a norbornane hydrocarbon group.

14. A process according to claim 7, wherein said solvent is an aprotic dipole polar solvent.

15. A polyimide exhibiting absorptions of stretching vibration of carbonyl group, at two positions of 1,650–1,730 cm$^{-1}$ and 1,730–1,790 cm$^{-1}$ due to imide group in its infrared absorption spectrum, which is obtained by heat-treating a polyamide acid that is the reaction product of 2,3,5-tricarboxycyclopentyl-acetic acid or its anhydride and a diamine.

16. A process for producing a polyimide which comprises reacting 2,3,5-tricarboxycyclopentyl-acetic acid or its anhydride and a diamine in a molar ratio of 1:0.7–1.3 in an organic solvent and directly heating the resulting polyamide acid solution at a temperature of 100°–500° C., or adding said polyamide acid solution to a non-solvent to coagulate the polyamide acid, molding the coagulated polymer and then heating it, or again dissolving the coagulated product in a solvent and heating the resulting solution.

17. A process according to claim 16, wherein said solvent is an aprotic dipole polar solvent.

* * * * *